May 19, 1942.  C. D. HAVEN  2,283,253
APPARATUS FOR PRODUCING MULTI-PLY GLASS SHEET GLAZING UNITS
Filed Sept. 7, 1939  2 Sheets-Sheet 1
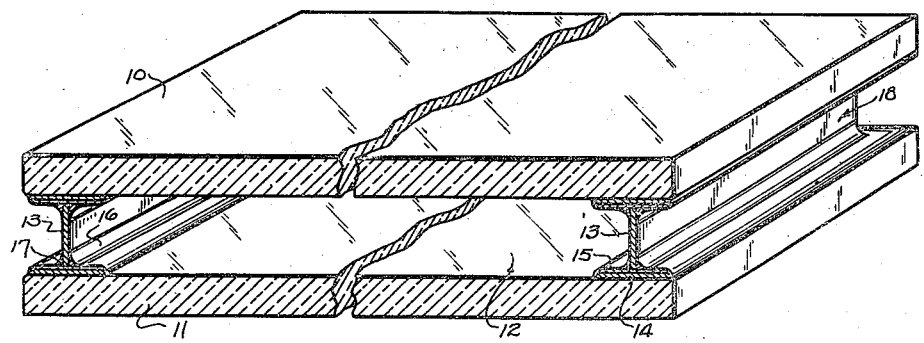
Fig. 1.
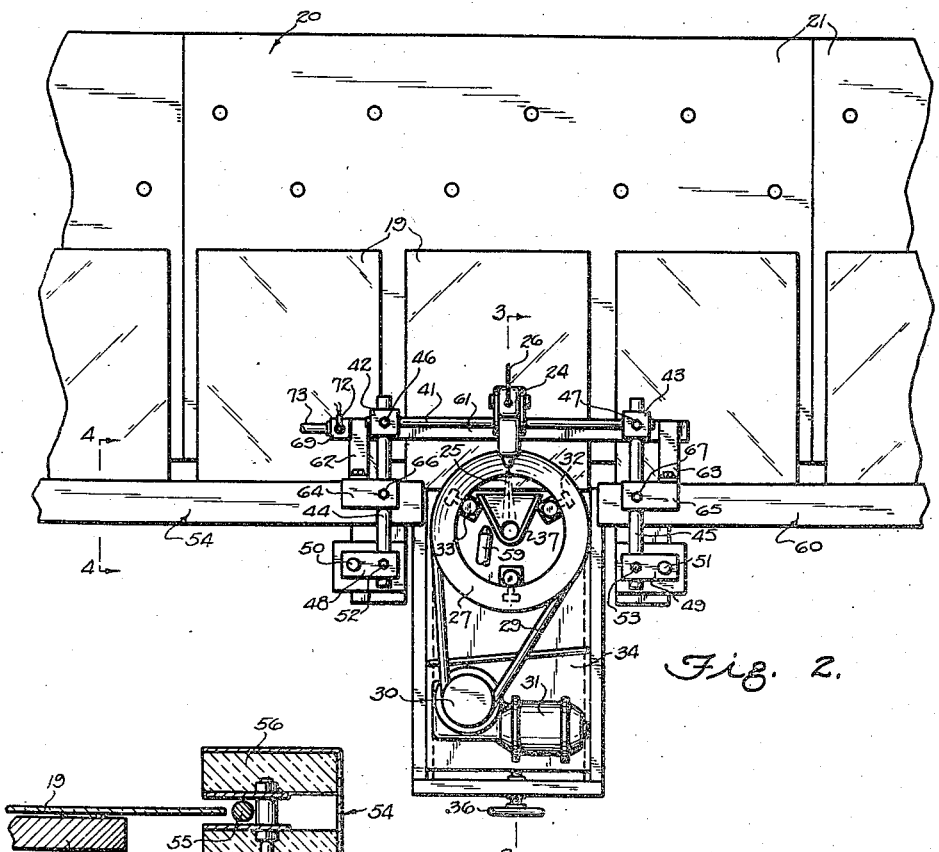
Fig. 2.
Fig. 4.
Inventor
CHARLES D. HAVEN.
By Frank Fraser
Attorney May 19, 1942.  C. D. HAVEN  2,283,253
APPARATUS FOR PRODUCING MULTI-PLY GLASS SHEET GLAZING UNITS
Filed Sept. 7, 1939  2 Sheets-Sheet 2
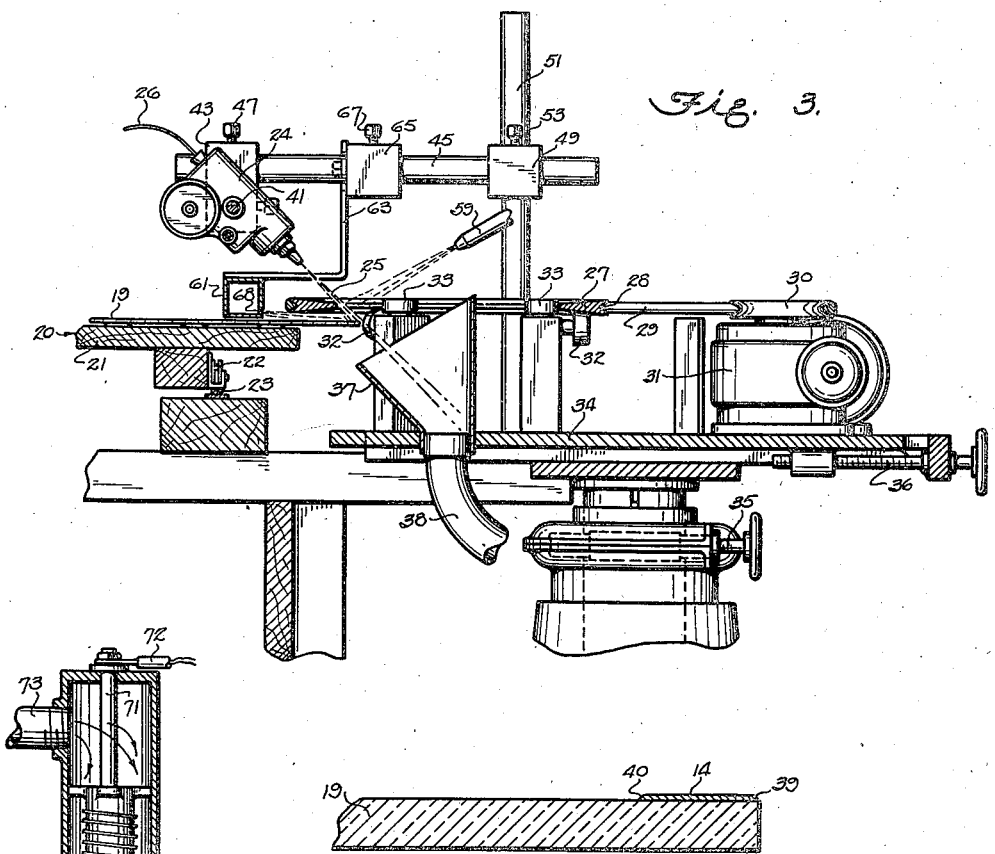
Inventor
CHARLES D. HAVEN.
By Frank Fraser
Attorney Patented May 19, 1942

2,283,253

UNITED STATES PATENT OFFICE 2,283,253

APPARATUS FOR PRODUCING MULTIPLY GLASS SHEET GLAZING UNITS

Charles D. Haven, Toledo, Ohio, assignor to Libbey-Owens-Ford Glass Company, Toledo, Ohio, a corporation of Ohio Application September 7, 1939, Serial No. 293,793

6 Claims. (Cl. 91—12.2)

The present invention relates to an apparatus for use in the manufacture of multi-ply glass sheet glazing units.

The invention is particularly concerned with the production of a multiple glass sheet glazing unit comprising two or more sheets of glass spaced apart by metallic separating means bonded to the glass sheets around the marginal portions thereof through the intermediary of a metallic coating or coatings to form an all glass-metal hermetically sealed structure.

The invention herein provided constitutes an improvement upon the apparatus for applying the metallic coating or coatings to the glass sheets preparatory to the assembling of them with the metallic separating means disclosed in the copending application of Charles D. Haven and John J. Hopfield, filed August 8, 1938, Serial No. 223,635. In such application, the metallic coatings are applied to the glass sheets by spraying the metal thereon with a conventional type of metal spray gun. This is accomplished by supporting the glass sheets in a horizontal position and passing them beneath the metal spray gun which is positioned to direct the metal spray upon the glass at an angle other than a right angle with respect thereto. To control the width of the metallic coatings applied to the glass sheets, there is provided a guard member positioned above the path of travel of the glass and having a portion covering the sheets inwardly of the marginal edge portions thereof to be metallized. The formation of metallic coatings of predetermined width and density is dependent upon several factors, among which may be mentioned the angle at which the metal spray is directed upon the glass, the distance of the metal spray gun from and its relation to the guard member and the distance of the guard member above the glass sheets. I have found that when these factors are so regulated and controlled to obtain the most satisfactory metallic coatings, both as to width, density and adhesion to the glass, there is a tendency for air eddies to be set up beneath the guard member resulting in back spray beneath said guard member. This back spray results in the formation of a metal mist upon the glass sheets inwardly of the metallic coatings causing a cloudy appearance which is very objectionable in the finished unit.

It is an aim of this invention to provide an apparatus for more accurately controlling the application of the metal spray to the glass sheets to provide metallic coatings of predetermined width and density, while at the same time preventing objectionable back spray and the formation of a metal mist upon the glass inwardly of the metallic coatings. Briefly, this is accomplished by introducing a gaseous fluid under pressure beneath the guard member to set up a pressure area which counteracts the formation of air eddies beneath said guard member. In this way, metal particles are prevented from passing inwardly beneath the guard member or, in other words, inwardly of the marginal edge portions of the glass sheets being metallized.

Other objects and advantages of the invention will become more apparent during the course of the following description, when taken in connection with the accompanying drawings.

In the drawings, wherein like numerals are employed to designate like parts throughout the same:

Fig. 1 is a perspective sectional view of a multi-ply glass sheet glazing unit constructed according to the invention;

Fig. 2 is a plan view of the apparatus employed for applying the metallic coatings to the glass sheets;

Fig. 3 is a vertical transverse section through the apparatus taken substantially on line 3—3 of Fig. 2;

Fig. 4 is a vertical transverse section through the means for heating the marginal edge portions of the glass sheets taken substantially on line 4—4 of Fig. 2;

Fig. 5 is a vertical longitudinal section through a portion of the apparatus showing the means for introducing a gaseous fluid under pressure beneath the guard member; and Fig. 6 is a fragmentary vertical transverse section through a sheet of glass having a metallic coating applied along the marginal edge portion thereof.

With reference particularly to Fig. 1, there is disclosed a glazing unit consisting generally of two sheets of glass 10 and 11 arranged in spaced, substantially parallel relation to provide an insulating air space 12 therebetween. This air space is formed by the use of metal separator strips 13 joined to the glass sheets through the intermediary of the metallic coatings 14 and 15 and the metal fillets 16 and 17 arranged at opposite sides of the separator strips 13 and uniting said strips to the metallic coatings 15. The separator strips 13 may be arranged inwardly of the outer edges of the glass sheets to form a channel 18 which may be filled with a suitable weatherproof seal. This seal may consist either of an organic or inorganic material. However, the use of the sealing material may not always be required and likewise the separator strips can be associated with the glass sheets so that they are flush with the peripheral edges thereof if desired.

As will be readily appreciated two or more sheets of glass can be fabricated into a glazing unit of this character giving one or more spaces between adjacent glass sheets as occasion may require. Therefore, while the invention has been illustrated in the drawings and will be herein described as applied to a two sheet unit, it will be understood that the invention is in no way confined to any particular number of glass sheets used or spaces between the sheets.

In view of the fact that the inner surfaces of the glass sheets cannot be cleaned after the unit is made and installed, it is highly desirable to use glass which is stable when in use. Likewise, before the unit is completed, the inner surfaces of the glass sheets should be thoroughly cleaned not only for the sake of appearance and permanency of the unit but also to facilitate application of the metallic coatings upon the glass in a manner to obtain permanent and adequate adhesion or bond between the glass and metal.

Although not essential, it is preferred that the coatings 14 on the glass sheets be produced from pure copper or an alloy of copper as it has been found that pure copper and some of its alloys can be sprayed upon the glass very satisfactorily and also weathers well in use. It is important, however, that the temperature of the glass be properly controlled at the time the metal is applied thereto. It may be mentioned that bronze may be used in lieu of copper and no doubt other satisfactory metal or metal alloys or multiple coats of different metals can be substituted for the copper coatings.

It is also preferred that the separator strips 13 be made from lead and that the lead strips and copper or other metallic coatings 14 on the glass be joined together by means of the layers 15 of solder or other inorganic bonding material. The soldering of the parts together is in effect a sweat job and the materials are so controlled both as to composition and form that reinforcing or strengthening fillets or accumulations of solder are formed on both sides of the separator strips to strengthen the construction and thus help to insure its permanency as will be more clearly hereinafter described.

After the metallic coatings 14 have been applied to the glass sheets, they are further prepared by applying thereto the layers 15 of a relatively softer metal which may be in the nature of a solder composition. The use of ordinary solder results in relatively high working temperatures with the soldering irons or other sources of heat whereby undesirable strains are set up between the copper or other metal coat and the glass. Therefore, it is preferred to make use of a low melting point solder with a wide plastic range of melting so as to reduce the temperature of applications and make use of a more plastic range of the solidifying points of the solder for the purpose of easier assembly. There are a number of variations of soft solders which can be used, and one which I have found to work satisfactorily consists of approximately 40 parts bismuth, 40 parts lead, and 20 parts tin.

As a matter of precaution and to insure the utmost of cleanliness, a suitable soldering flux, of which there are a large number, may be and preferably is used to get a permanent satisfactory union between the solder layer 15 and the metallic coating 14 on the glass. A film of the flux material can be applied to the metallic coating 14 by means of a brush or in any other desired manner. The flux treated metallic coating may then be coated with the layer of solder 15, using for this purpose an ordinary soldering iron.

After the metallic coatings 14 and 15 have been applied to the glass sheets, the separator strips are associated therewith substantially as shown in Fig. 1. Ordinarily, it is desirable to place the separator strips back from the edges of the glass sheets and approximately centrally of the metallic coatings 14 to produce the channel 18 for receiving the weatherproofing seal, although this is of course a matter of choice. An electric iron or other suitable heating means may then be employed to run the solder fillets 16 and 17 on opposite sides of the separator strips. In this way, the solder completely surrounds the edges of the separator strips giving what might be called a sweat joint and producing fillets on both sides of the separator strips to give a balanced type of joint capable of standing strain and stresses in both directions laterally of said separator strips. The solder forming the fillets of course blends or amalgamates with the layer of solder 15 into a single mass or volume of solder permanently adherent to the separator strips and metallized coatings 14. While I have referred to the separator means as comprising metal strips, a single length of metal may be used for the separator and shaped to form a continuous strip.

In Figs. 2 to 5, inclusive, is illustrated the apparatus for applying the copper or other base coating of metal 14 to the marginal edge portions of the glass sheets. As shown, the glass sheets 19 rest horizontally upon and are carried forwardly by a conveyor 20 which may consist of a plurality of tables 21 arranged end to end and mounted upon wheels 22 which roll along tracks 23 (Fig. 3). Of course, any other suitable type of conveyor may be employed. Disposed above the conveyor 20 is a metallizing gun 24 which may be of any construction capable of producing a spray of metal 25 which can be directed upon the pre-selected edge portions of the glass sheets moving thereunder. I have found that very satisfactory results can be obtained when using a spray gun in which a metal wire 26 is fed into the gun, melted and sprayed in fine particles upon the glass. The deposit of metal upon the glass is not only controlled by the relative position of the metallizing gun with respect to the glass, speed of wire through the gun, and speed of movement of the glass, but also by a guard member 27 designed for this particular purpose.

The guard member 27 comprises a horizontal annular ring substantially V-shaped in cross section, with the thin edge thereof disposed inwardly and terminating short of the edge of the glass sheets to be coated. The guard member is also provided around its outer edge with a groove 28 adapted to receive a belt 29 driven by a pulley 30 operated from motor 31. The guard member 27 is supported on rollers 32 and held in proper position by guide rollers 33 engaging the inner edge thereof. The guard member is adapted to rotate rather slowly and serves as a mask or shield for controlling the width of the sprayed metallic coatings 14 upon the glass.

The width of the metallic coatings so formed is dependent upon the relative position of the guard member with respect to the sheet edges and can be made narrower or wider by suitable adjustment. The guard member 27 and associated parts are mounted on a platform 34 provided with the adjusting mechanism 35 for controlling the vertical adjustment of said guard member, while lateral adjustment thereof is controlled by the adjusting mechanism 36. A trough 37 may be provided to catch excess sprayed metal which is not deposited upon the glass. This trough can be connected by a conduit 38 to a suitable exhaust fan mechanism to carry away fumes, gases, etc., as will be apparent. Ordinarily, some of the metal spray will tend to adhere to the guard member and such deposit should be removed from time to time.

In practice, the glass sheets 19 are laid horizontally upon the conveyor 20 so that the marginal edge portions thereof to be coated project forwardly beyond the front edge of the conveyor as clearly shown in Fig. 3. They are carried in this manner beneath the guard member 27 and metal spray gun 24. As each glass sheet passes beneath the guard member and metal spray gun, the forward marginal edge portion thereof is adapted to be sprayed with the metal to form the coating 14 thereon. As shown in Fig. 6, the metallic coating 14 is preferably tapered along its opposite edges as indicated at 39 and 40 to give a so-called feather edge. The outer feather edge 39 may be formed by an abrading operation, while the inner feather edge 40 may be created without resorting to abrasion treatment. Thus, it can easily be obtained by proper positioning of the metallizing gun 24 with respect to the glass sheet and guard member 27.

To facilitate proper adjustment of the spray gun, it is carried on a horizontal shaft 41 rotatably mounted at its opposite ends in bearing blocks 42 and 43 slidable on horizontal transverse rods 44 and 45 respectively. The bearing blocks 42 and 43 are adjustably secured to the rods 44 and 45 by set screws or the like 46 and 47 respectively. The rods 44 and 45 are in turn carried by blocks 48 and 49 slidably mounted on vertical standards 50 and 51 respectively and secured in desired position by set screws or the like 52 and 53.

Care should be exercised in determining the angularity of the discharge nozzle of the metallizing gun 24 so that the metal deposit 14 formed on the glass will be of substantially uniform thickness and have the tapered or feather edge 40.

Before the metal is sprayed upon the glass, the marginal edge portions of the glass sheets are first preferably heated to prevent thermal shock of the glass itself and also to enable a proper bonding of the metal to the glass. The exact temperature used will vary somewhat with the size and thickness of glass, but in all cases care should be exercised to avoid warpage of the glass and heating should be confined to that area below the critical annealing point of the glass. For ordinary plate and window glass, I have found a temperature of between 500 and 600 degrees F. to be satisfactory. Heating of the glass sheets in this way prior to spraying of the metal thereon results in an excellent bond between the glass and metal.

To this end, as the glass sheet 19 is carried along by the conveyor 20 and before it reaches the metal spray gun 24, the forward marginal edge portion of the sheet, which projects beyond the conveyor, passes through an electrical heating device 54. This heating device may comprise an electrical heating element 55 arranged between the upper and lower insulated cover plates 56 and 57 carried by supports 58. As best shown in Fig. 4, no part of the heating device actually touches the glass surface to be coated. In lieu of, or in addition to, the electric heating element 55, gas burners may be employed and, in any event, it is preferred to use gas burners in the vicinity of the metallizing gun, one of which is indicated 59. The number of heaters and length of heating zone are dependent naturally upon the speed of the machine and exact operating temperatures desired. It is preferred that the heating be done as rapidly as possible and confined to a narrow strip at the edge of the glass. This serves to confine the compressional strain to a narrow band and helps to prevent warping and breaking of the glass. After the glass sheet passes beyond the heating device 54 and just before the metal is sprayed thereon, the marginal edge portion thereof is subjected to the action of the burner 59 which heats the surface of the glass to the desired maximum temperature for the reception of the metal spray. The heaters are so controlled that when the glass reaches a position under the gun, it is within the predetermined temperature range desired.

After the glass sheet has been sprayed, the metal coated edge portion thereof is adapted to pass through one or more heating devices 60, and these heaters are important because their use permits a gradual lowering of the glass temperature to that of the surrounding atmosphere. This is in effect an annealing of the metallized glass edge portion.

As brought out above, in order to obtain sprayed metallic coatings on the glass sheets of a predetermined width and density and having the required adhesion to the glass, it has been found that the metal spray gun 24 must be positioned at a predetermined angle to as well as at a predetermined distance above the glass sheet. Likewise, it must be properly positioned with respect to the guard member 27 which must, in turn, be properly located with respect to glass. These factors must be accurately controlled along with the speed of wire through the gun and the speed of travel of the glass sheets, in order to obtain maximum efficiency. I have found, however, that when these factors are regulated and controlled in a manner to obtain maximum efficiency there is a tendency for back spray to occur beneath the guard member 27. That is to say, air eddies are set up beneath the guard member which cause metal particles to be drawn inwardly beneath said guard member. These particles are deposited upon the glass in the form of a mist, giving to the glass a cloudy effect which is very objectionable in the finished unit. According to the present invention, the formation of air eddies beneath the guard member is prevented by establishing a pressure area thereboeneath. This is accomplished by introducing a gaseous fluid, such as heated air or steam, under pressure beneath the guard member to counteract the tendency toward back spray of the metal.

In the embodiment illustrated in the drawings, there is provided a horizontal hollow member 61 in the form of an elongated metal casing rectangular in cross section. The metal casing extends substantially parallel with the forward edges of the glass sheets and is carried at its opposite ends by brackets 62 and 63 secured to blocks 64 and 65 which are slidable upon the rods 44 and 45 respectively and held in adjusted position by set screws or the like 66 and 67. As best seen in Figs. 3 and 5, the front wall of the casing 61 is provided with a plurality of horizontally aligned openings or orifices 68 through which jets of air or steam under pressure are projected beneath the guard member 27 substantially parallel with the upper surfaces of the glass sheets and toward the outer edges thereof. These jets of air or steam serve to counteract any tendency for air eddies to be formed beneath the guard member and thereby serve to prevent any particles of metal to be drawn beneath the guard member and deposited upon the glass inwardly of the preselected marginal edge portion to be coated.

If air is used, it is adapted to be heated, preferably to approximately the temperature of the glass sheet. To this end, there is carried at one end of the casing 61 a vertical housing 69 in which is mounted an electrical heating unit 70 carried by a rod 71 and connected with a suitable source of energy by the lead wire 72. Communicating with the housing 69 adjacent its upper end is an air inlet pipe 73. The air entering through the pipe 73 passes downwardly through the housing 69 around the electrical heating unit 70 and then into the casing 61 and out through the openings 68. By preventing back spray on the glass surfaces adjacent to the coated portions, a well defined margin of metal is obtained on the glass sheets.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for metallizing the marginal edge portions of glass sheets, means for supporting the sheets to be metallized in a substantially horizontal position, metallizing means mounted above the sheet supporting means for applying a metal spray to the marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, and means for setting up a moving pressure area of compressed gas beneath the guard member inwardly of and directed toward the sheet edges for preventing back spray beneath said guard member and the formation of metal mist upon the glass inwardly of the metallic coatings.

2. In apparatus for metallizing the marginal edge portions of glass sheets, means for supporting the sheets to be metallized in a substantially horizontal position, means for heating the marginal portions of the glass sheets, metallizing means mounted above the sheet supporting means for applying a metal spray to the heated marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, and means for setting up a heated moving pressure area of compressed gas beneath the guard member inwardly of and directed toward the sheet edges for preventing back spray beneath said guard member and the formation of metal mist upon the glass inwardly of the metallic coatings.

3. In apparatus for metallizing the marginal edge portions of glass sheets, means for supporting the sheets to be metallized in a substantially horizontal position, metallizing means mounted above the sheet supporting means for applying a metal spray to the marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, and means for introducing a gaseous fluid under pressure beneath the guard member and for directing the same toward the edges of the glass sheets to prevent back spray beneath said guard member and the formation of metal mist upon the glass inwardly of the metallic coatings.

4. In apparatus for metallizing the marginal edge portions of glass sheets, means for supporting the sheets to be metallized in a substantially horizontal position, means for heating the marginal portions of the glass sheets, metallizing means mounted above the sheet supporting means for applying a metal spray to the heated marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, and means for introducing a gaseous fluid under pressure beneath the guard member and for directing the same toward the edges of the glass sheets to prevent back spray beneath said guard member and the formation of metal mist upon the glass inwardly of the metallic coatings.

5. In apparatus for metallizing the marginal edge portions of glass sheets, means for supporting the sheets to be metallized in a substantially horizontal position, metallizing means mounted above the sheet supporting means for applying a metal spray to the marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, and means for setting up a pressure area beneath the guard member inwardly of the sheet edges for preventing back spray beneath said guard member and the formation of metal mist upon the glass inwardly of the metallic coatings, including a hollow member for receiving a gaseous fluid under pressure and having openings therein for directing the gaseous fluid toward the edges of the glass sheets and substantially parallel with said sheets.

6. In apparatus for metallizing the marginal edge portions of glass sheets, means for supporting the sheets to be metallized in a substantially horizontal position, means for heating the marginal portions of the glass sheets, metallizing means mounted above the sheet supporting means for applying a metal spray to the heated marginal portions of the glass sheets, means for causing relative horizontal movement between the glass sheets and metallizing means, a guard member positioned between the sheet supporting means and metallizing means and having a portion thereof disposed inwardly of the outer edges of the glass sheets for controlling the width of the metallic coatings applied thereto, means for setting up a heated pressure area beneath the guard member inwardly of the sheet edges for preventing back spray beneath said guard member and the formation of metal mist upon the glass inwardly of the metallic coatings, including a hollow member for receiving a gaseous fluid under pressure and having openings therein for directing the gaseous fluid toward the edges of the glass sheets and substantially parallel with said sheets, and means for heating the gaseous fluid.

CHARLES D. HAVEN.